May 5, 1953 H. G. McGRATH 2,637,739
SYNTHESIS OF ORGANIC COMPOUNDS
Filed Aug. 21, 1948
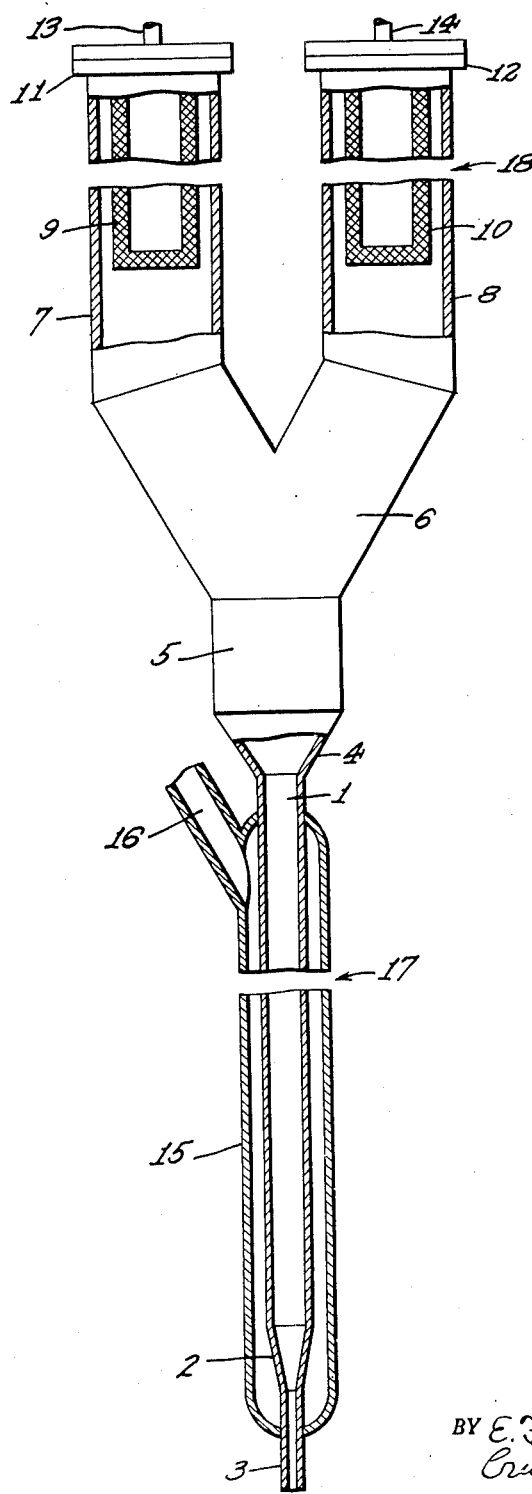
INVENTOR
HENRY G. McGRATH
BY E. F. Liebrecht
Cruzan Alexander
ATTORNEYS Patented May 5, 1953

2,637,739

UNITED STATES PATENT OFFICE 2,637,739

SYNTHESIS OF ORGANIC COMPOUNDS

Henry G. McGrath, Elizabeth, N. J., assignor to The M. W. Kellogg Company, Jersey City, N. J., a corporation of Delaware Application August 21, 1948, Serial No. 45,467

11 Claims. (Cl. 260—449.6)

This invention relates to an improved method for hydrogenating carbon oxides to produce hydrocarbons and oxygenated organic compounds. The carbon oxides treated comprise primarily carbon monoxide and carbon dioxide, but may include also other organic compounds which contain the carbonyl group, such as ketones, aldehydes, acyl halides, organic acids and their salts and esters, acid anhydrides, amides, etc., and whose reaction with hydrogen to produce other oxygenated compounds and hydrocarbons is promoted by catalysts and reaction conditions which are effective to promote the reaction of hydrogen with carbon monoxide. While the improved process is applicable to the hydrogenation of these compounds of carbon and oxygen, to produce both hydrocarbons and oxygenated organic compounds, the invention is particularly applicable to the large scale production of hydrocarbons by the hydrogenation of carbon monoxide.

The object of this invention is to provide an improved supported catalyst for the hydrogenation of carbon oxide by contact with the catalyst in finely divided form.

Another object of this invention is to provide a novel catalyst composition for use in the hydrogenation of carbon oxide.

Various other objects and advantages will become apparent to those skilled in the art from the accompanying description and disclosure.

The above-described reactions may be carried out in a highly advantageous manner by passing the reactants as a gas stream upwardly in a reaction zone through a mass of finely divided solid catalyst. In one embodiment of this invention the gas stream is passed through the catalyst powder at a linear velocity which is effective to suspend the catalyst in the gas stream in a dense fluidized pseudo-liquid phase in which the particles of catalyst circulate at a high rate. If the velocity of the gas stream is maintained sufficiently low, the catalyst mass assumes a condition which is described as "pseudo-liquid" for the reason that the mass exhibits many of the properties of a true liquid, particularly as to flowability and density. The gas velocity necessary to produce this condition depends somewhat upon the character and condition of the catalyst; but it is preferred ordinarily to pass the gas stream through the catalyst at a velocity which is sufficiently low to produce the above described condition but sufficiently high without substantial entrainment to produce turbulence in the mass whereby the particles circulate at a high rate throughout the mass of contact material.

Under the conditions described above, the fluidized mass of contact material is quite dense, resembling in this respect a settled mass of the same material. The density of the fluidized mass may be not less than half that of the settled mass. The fluidized catalyst mass is suspended in the gas stream but there is no movement of the catalyst mass as a whole along the path of flow of the gas stream. Thus, while the catalyst mass is suspended in the gas stream, it is not entrained therein. However, a small proportion of the particles of the fluidized mass may become entrained and carried away in the gas stream emerging from the dense pseudo-liquid catalyst mass.

To produce the fluidized catalyst mass the gas stream is passed into the bottom of the reactor through a relatively small inlet at an inlet velocity such that solids in the reactor are prevented from passing downwardly out of the reactor through the gas inlet. The horizontal dimension of the reactor and the rate of flow of the gas stream into the reactor are controlled to produce in the reactor a gas velocity effective to maintain the catalyst mass in the fluidized condition. This velocity is defined ordinarily in terms of the velocity of the gas stream through an empty reactor which is referred to as the superficial velocity. Ordinarily, superficial velocities of 0.1 to 10 feet per second are employed for pseudo-liquid type operations; the actual velocity depends on such factors as catalyst density, composition and size.

It is preferred ordinarily in pseudo-liquid type operations to provide a reactor having a volume substantially greater than the desired volume of the fluidized catalyst mass. In such a large reactor the catalyst forms the relatively dense fluidized mass described above which occupies the lower part of the reactor and which is referred to hereafter as the dense phase. In the upper part of the reactor the density of catalyst in the gas is substantially less and of a different order of magnitude than the density of the catalyst in the dense phase. The upper phase may be referred to as a diffuse phase. In the diffuse phase there is substantial disengagement by settling of solids which are lifted above the dense phase by the gas stream. Depending upon the gas velocity and the particle size of the catalyst mass, such settling may effect substantially complete disengagement of solids from the gas stream. Ordinarily, however, a substantial proportion of the particles comprising the catalyst mass has a free settling rate less than the superficial velocity of the gas stream, whereby a small proportion of the catalyst is carried from the reactor in the exit gas stream in the absence of special means to effect separation of the suspended solids from the gas stream.

Between the dense catalyst phase and the upper diffuse phase there is an interface which is a relatively narrow zone in which the concentration of solids in the gas stream changes from the high concentration of the dense phase to the low concentration of the diffuse phase.

In order to produce the desired turbulent pseudo-liquid condition in the dense phase, it is desirable that at least a substantial proportion of the contact material consist of particles whose free settling rate is less than the superficial velocity of the gas stream. The mass of contact material may consist advantageously of a mixture of particles varying in size from 40 to 400 microns (average diameter), although particles of larger or smaller diameter may be present.

The pseudo-liquid type operation is initiated by charging the reactor with the desired quantity of the contact material. Thereafter, the contact mass in the reactor is fluidized by the passage of a gas stream upwardly therethrough at the proper velocity. Alternatively, a gas stream may be passed through the empty reactor, while catalyst is charged to the reactor at a rate in excess of the rate at which catalyst is carried out of the reactor in the gas stream. In this manner, the desired volume of fluidized dense phase may be built up. During the operation it may be necessary to add catalyst to the reactor continuously or intermittently to replace deactivated catalyst, or to replace catalyst carried from the reactor with the product gas stream.

The reaction is initiated by heating the fluidized contact mass to a temperature effective to initiate the reaction. Thereafter, it is necessary to cool the fluidized contact mass to maintain the reaction temperature at the desired level. It is a feature of the pseudo-liquid method of operation that the circulation of the particles in the fluidized mass promotes rapid and efficient heat exchange between the various parts of the fluidized mass whereby a substantially uniform condition in the mass is maintained. Consequently, the excess heat of reaction may be withdrawn from the reaction zone by cooling a part of the fluidized mass. This may be effected in whole or in part by introducing the reaction gas in a cold condition, but it is necessary ordinarily to provide additional means for withdrawing heat from the contact mass. This may be provided for by indirect heat exchange means of the character indicated below in the example or by introducing a cold gas or vaporizable liquid directly into the dense phase.

Another mode of operation involves the use of sufficiently high gas velocities to entrain the contact material such that all of it continuously moves in the direction of flow of the gases. The entrained contact material passes from the reaction zone with the effluent gases to a solids separator, such as a conventional settling zone or cyclone separator. Contact material is separated from the effluent gases and recycled, after aeration and/or stripping, to the reaction zone. The concentration of contact material in the gases in the reaction zone is materially less than characteristic of dense phase operations. Generally, superficial gas velocities above 5 feet per second are employed, preferably 8 to 40 feet per second or higher, depending on such factors as catalyst density, composition and size, and reaction conditions employed. As with dense phase operations, the reaction zone may be cooled indirectly by conventional means, or directly by injection of a cooling medium therein.

The catalysts, or contact material, ordinarily employed in the reaction of hydrogen and carbon oxides, include hydrogenating metals which may or may not be employed in combination with activating metal oxides and supporting materials. The hydrogenating metal catalysts which are employed ordinarily include the metals of group VIII of the periodic system. While metallic iron or iron oxide may be employed satisfactorily without the use of supporting materials, it is preferred to employ the catalytic metals of group VIII having an atomic number higher than 26, such as cobalt and nickel, in combination with suitable supports to be discussed hereinafter. In addition, activating metal oxides may be incorporated in such contact materials. These include alkalis, alumina, silica, titania, thoria, manganese oxide and magnesia. For example, a catalyst may comprise metallic cobalt in combination with approximately one to three times its weight of support and approximately 0.05 to 0.2 its weight of a difficultly reducible metal oxide, such as thoria or magnesia.

In connection with his invention, it has been discovered that catalysts comprising supports of the character previously employed, such as kieselguhr, are inferior, when used in the fluidized powder form described above, to catalysts comprising supporting materials not previously suggested for use. It has been found particularly that superior catalysts for use in the fluidized powder form may be produced by employing as a support a synthetic silica gel-alumina type support. Silica gel alone does not exhibit as good physical and catalytic characteristics as does silica gel combined with alumina.

A suitable synthetic silica gel-alumina support may be prepared by admixing a sodium silicate solution and a sulfuric acid solution under conditions such that silica gel is precipitated. The hydrous silica gel is thereafter admixed with an aluminum sulfate solution, to which is added an appropriate quantity of an ammonia solution to precipitate aluminum hydroxide upon the silica gel. The aluminum hydroxide impregnated silica gel is recovered by filtration and is partially dehydrated at a temperature above 1000° F. The resulting partially dehydrated silica gel which is impregnated with alumina may be calcined at higher temperatures and for longer times to remove substantially all of the remaining water therefrom, but omission of the calcining treatment in preparing the gel may be practiced without departing from the scope of this invention. The calcining treatment may be unnecessary in some instances and even undesirable.

The silica gel-alumina support of this invention contains between about 5 and about 20 weight per cent alumina, preferably between about 10 and about 15 weight per cent alumina. The water content of the support is less than about 50 weight per cent, and preferably less than about 10 weight per cent when the calcination treatment is employed.

In forming the preferred catalytic contact material, the hydrogenating metal is precipitated from a solution of a water-soluble metal salt on the finely-divided synthetic silica gel-alumina supporting material which has been previously calcined. The resulting mixture after suitable drying is subjected to a reducing treatment at a temperature of approximately 750° F. to decompose the metal salt to the oxide and to convert the metal oxide to the metal. The mixture may be ground further, if desired, before or after the reduction treatment to produce the desired particle size distribution. Any promoting oxides which are employed, such as thoria and magnesia, may be incorporated by precipitating them from a solution of their water-soluble metal salts on the silica gel-alumina along with the hydrogenating type metal oxide.

The hydrogenating catalysts containing supports previously employed are not suitable for use in the hydrogenating of a carbon oxide because their activities are relatively low. Moreover, these previously used supported catalysts are difficult to maintain in a fluidized condition when employed in fluidized operations, because of the relatively narrow range of velocities by which they can be fluidized. On the other hand, the silica gel-alumina support results in a hydrogenation catalyst of optimum activity for the hydrogenation of carbon oxides, which can be maintained in a fluidized condition over relatively wide gas velocities and reaction conditions.

The invention will be described in more detail by reference to the specific examples of the use of the improved catalytic contact material in the conversion of hydrogen and carbon monoxide to normally liquid organic products. The accompanying drawing is a view in elevation, partly in cross-section, of the reactor employed in carrying out the specific operation referred to in the example.

Referring to the drawing, reactor 1 consists of a length of extra heavy 2-inch steel pipe which is 153 inches long and has inside and outside diameters of 1.94 inches and 2.38 inches, respectively. Reactor 1 is connected by a conical section 2 to an inlet pipe 3 made of extra heavy half-inch steel pipe having an inside diameter of 0.55 inch. Reactor 1 is connected at the top, by means of conical section 4, with an enlarged conduit 5 comprising a length of 6-inch extra heavy steel pipe having an inside diameter of 5.76 inches. Conical section 4 and conduit 5 constitute an enlarged extension of reactor 2 which facilitates disengagement of catalyst from the gas stream after passage of the latter through the dense catalyst phase.

Conduit 5 is connected by means of manifold 6 with conduits 7 and 8 which comprise other sections of extra heavy 6-inch steel pipe. Conduits 7 and 8 contain filters 9 and 10 which are constructed of porous material which is permeable to the gas and vapors emerging from the reaction zone but substantially impermeable to the catalyst particles carried by entrainment in the gas stream. Filters 9 and 10 are cylindrical in shape and closed at the bottom ends. They are dimensioned in relation to conduits 7 and 8 to provide a substantial annular space between the filter and the inner wall of the enclosing conduit for the passage of gases and vapors and entrained catalyst upwardly about the outer surface of the filter. The upper ends of filters 9 and 10 are mounted in closure means 11 and 12 in a manner whereby the gases and vapors must pass through either filter 9 or filter 10 to reach exit pipes 13 and 14. Each of filters 9 and 10 is approximately 36 inches long and 4½ inches in outside diameter, the filter walls being approximately ¾ of an inch thick.

The greater part of reactor 1 is enclosed in a jacket 15 which extends from a point near the top of the reactor to a point sufficiently low to enclose the 3 inch length of conical section 2 and approximately 5 inches of pipe 3. Jacket 15 comprises a length of extra heavy 4-inch steel pipe having an inside diameter of 3.83 inches. The ends of jacket 15 are formed by closing the ends of the 4-inch pipe in any suitable manner, as shown. Access to the interior of jacket 15 is provided by an opening 16 in the top thereof through a 2-inch steel pipe. Jacket 15 is adapted to contain a body of liquid for temperature control purposes, such as water, or "Dowtherm" (a constant boiling mixture of diphenyl and diphenyl oxide). The vapors which are evolved by the heat of reaction are withdrawn at 16, condensed, and returned through 16 to the body of temperature control fluid in jacket 15. The temperature control fluid in jacket 15 is maintained under a pressure at which the liquid boils at the temperature desired in jacket 15. Heating means, not shown, are provided in connection with jacket 15 to heat the temperature control fluid therein to any desired temperature.

In order to show all the essential parts of the reactor and associate catalyst separation means on a single sheet a large proportion of the apparatus has been eliminated by the breaks at 17 and 18. For a clear understanding of the relative proportions of the apparatus reference may be had to the over-all length of the apparatus, from the bottom of jacket 15 to exit pipes 13 and 14, which is 224 inches. In each of breaks 17 and 18 the portion of the apparatus eliminated is identical with that portion shown immediately above and below each break.

In the operations carried out in the apparatus of the drawing the catalyst recovery means comprising filters 9 and 10 is effective to separate substantially completely entrained catalyst from the outgoing stream of gases and vapors. The disengagement of solids from the gas stream is promoted by the lowered velocity of the gas stream in conduit 5 and remaining solids are separated on the outer surfaces of filters 9 and 10. The latter are employed alternatively during the operation so that the stream of gases and vapors and entrained solids passes from conduit 5 through either the left or right branches of manifold 6 into conduit 7 or conduit 8. During the alternate periods, the filter which is not in use is subjected to a back pressure of inert gas which is introduced at a rate sufficient to dislodge catalyst which has accumulated on the outer surface of the filter during the active period. Such "blow-back" gas and dislodged catalyst flows downwardly in the conduit enclosing the filter and into manifold 6 in which the "blow-back" gas is combined with the reaction mixture flowing upwardly from conduit 5. The greater part of the catalyst thus dislodged settles downwardly into the reactor and is thus returned for further use.

In the operation of the apparatus of the drawing the desired quantity of powdered catalyst is introduced directly into the reactor through a suitable connection, not shown, in conduit 5. After any desired preliminary activation treatment the temperature of the fluid in jacket 15 is adjusted, by the heating means mentioned above and by the pressure control means, to the temperature desired to be maintained in jacket 15 during the reaction. After the catalyst mass has reached the reaction temperature the introduction of the reaction mixture through pipe 3 is initiated. The reaction mixture may be preheated approximately to the reaction temperature prior to its introduction through pipe 3 or the reactants may be heated to the reaction temperature through the passage thereof through that portion of pipe 3 which is enclosed by jacket 15 and by contact with the hot catalyst. It will be understood, furthermore, that the enclosure of pipe 3 in jacket 15 is not necessary to the invention and that the reactants may be heated to the reaction temperature solely by contact with the hot catalyst.

Pipe 3 is dimensioned with respect to reactor 1 and the desired superficial velocity whereby the velocity of the gases passing through pipe 3 is sufficiently high to prevent the passage of solids downwardly into pipe 3 against the incoming gas stream. A ball check valve, not shown, is provided in pipe 3 to prevent solids from passing downwardly out of the reactor when the gas stream is not being introduced into pipe 3.

EXAMPLE

A catalyst for promoting the reaction of carbon monoxide with hydrogen was prepared as follows: About 10,000 grams of cobalt nitrate, $Co(NO_3)_2.6H_2O$, and 1050 grams of thorium nitrate, $Th(NO_3)_2.4H_2O$, were dissolved in 50 liters of water. About 6500 grams of sodium carbonate, $Na_2CO_3.H_2O$, were dissolved in 50 liters of water. Both solutions were heated to the boiling point (185° F.+) and the nitrate solution was then added to the carbonate solution with continuous stirring. After the resulting mixture has been stirred thoroughly, 4,000 grams of calcined silica gel-alumina support in finely-divided form at a temperature of 210° F. were added to the solution with vigorous stirring. After thorough stirring, the resulting mixture was then filtered under a pressure of 30 to 50 pounds per square inch gage. The filter cake was washed in the filter with 160 gallons of water at 180° F. and at a pressure of 50 pounds per square inch gage. The washed filter cake was dried overnight at room temperature by means of an air blower. The partially dried material was dried at 210° F. to a moisture content of about 54 per cent and was then extruded through ⅜ inch dies. The extruded material was then dried overnight at 220° F. to obtain a product having a moisture content of about 20 per cent. This material was then ground to produce a granular mass finer than 6 mesh but coarser than 20 mesh. The granular material thus produced was reduced in an oven at one atmosphere pressure by means of a circulating stream of hydrogen equivalent to a space velocity of 60 v./hr./v. from which circulating stream water and carbon dioxide were removed continuously. The temperature of the mass of catalyst during this operation was gradually raised to a final temperature of 750° F. during which time the production of water ceased. The reduced catalyst was then ground in an atmosphere of $CO_2$ to a powder of the desired size. The following Table I is a screen analysis of this powder:

*Table I*

| Size Range | Weight Percent |
| --- | --- |
| +40 | Trace. |
| 40/100 | 38.1. |
| 100/140 | 16.2. |
| 140/200 | 15.2. |
| 200/pan | 30.5. |

This catalyst had the following approximate composition in parts by weight: Co:0.25 ThO:2.0 silica gel-alumina support.

The silica gel-alumina supporting material contained about 13 weight per cent alumina and about 4 weight per cent water, and was prepared in a manner similar to the following: A 4.2 weight per cent sodium silicate aqueous solution at a temperature of about 82° F. is added to a 30 per cent sulfuric acid solution to obtain a pH of about 9.5. The mixture is allowed to set for about 4 minutes with vigorous agitation. Thereafter the pH of the solution is adjusted to about 2.5 by the addition thereto of further 30 per cent sulfuric acid solution. The resulting 2.5 pH solution is allowed to set for about thirty minutes to peptize the silica and form a slurry. A 5 per cent ammonia solution is then added to the slurry with constant stirring to obtain a pH of 6.5 whereby substantially all the silica is gelled. To the neutralized slurry of silica gel is added an 18 weight per cent aluminum sulfate solution in an amount sufficient to result in about 13 weight per cent alumina in the final product. To the slurry of silica gel and aluminum sulfate is added slowly with constant stirring a 13.5 weight per cent ammonia solution. Care must be exercised to maintain the slurry slightly acid at the point of addition of the ammonia solution, such as by slow addition and constant stirring. Aluminum hydroxide (or $Al_2O_3$) precipitates on the surface and in the pores of the silica gel.

Throughout the mixing steps localized overacidity or over-basicity should be avoided by careful mixing and control of the rate of addition of the solutions.

The resulting slurry of aluminum hydroxide-impregnated silica gel is filtered under a subatmospheric pressure of about 15 to 20 inches of mercury. The filtered silical gel-alumina support is dried from a moisture content of about 90 per cent to less than 50 per cent, usually about 40 to 45 per cent, at a temperature of about 1400° F. In order to remove salts of ammonium and sodium, the partially dried support is repeatedly washed with a 2.5 pH aqueous solution. The washed silica gel-alumina support is then calcined at a temperature of 1500° F. for a sufficient length of time to reduce the water content to about 4 per cent. The coarse support is then ball milled to reduce its size. The resulting silica gel-alumina support has a density of about 50 pounds per cubic foot.

Reactor 1 was purged by means of carbon dioxide and, while a small stream of carbon dioxide was passed through reactor 1, about 10 pounds of the catalyst prepared as described above were introduced while maintained in an atmosphere of carbon dioxide. The catalyst mass was then heated to approximately 300° F. by heating the water bath in jacket 15. At that point a small stream of hydrogen was substituted for the carbon dioxide as the aerating medium. Heating was continued to a temperature of approximately 360° F. at which point the passage of stream of reaction gas, consisting essentially of $H_2$ and CO in the ratio of approximately 2:1, was initiated. The reaction temperature was then raised during a period of 12 hours to 396° F.

This operation was continued for approximately 200 hours during which time the gas was passed through the reactor at varying experimental conditions. Both single pass and recycle operations were used. The reaction temperature varied from 396° F. to 422° F. The pressure varied from 10 to 100 pounds per square inch gage. The feed gas, which consisted substantially entirely of hydrogen and carbon monoxide in a ratio of about 2:1, was charged to the reactor at space velocities of 190 to 585 volumes of gas (measured at standard conditions of temperature and pressure) per volume of dense catalyst phase per hour. A high rate of conversion of carbon monoxide to liquid hydrocarbon products was maintained throughout the operation, which was terminated arbitrarily. Throughout this operation the catalytic contact mass exhibited the desired dense fluidized pseudo-liquid condition with the result that uniform temperature conditions were maintained throughout the reactor at all times. At no time during the operation was there observed any accumulation of deposits on the contact material which interfered with the fluidized condition. Examination of the catalyst after the termination of the operation showed it to be a finely-divided non-adherent easily fluidizable material.

For a specific example of the operating conditions for production rate in this operation, reference is made to the accompanying Table II which shows the operating conditions and results for the above run.

*Table II*

| Hours on Condition | 12 | 12 | 43 | 8 | 12 | 24 | 28[1] |
|---|---|---|---|---|---|---|---|
| Catalyst Age, Hours | 92 | 104 | 147 | 155 | 167 | 191 | 227 |
| Operating Conditions: | | | | | | | |
| Av. Catalyst Temp., °F | 396 | 413 | 411 | 414 | 422 | 421 | 422 |
| Maximum Temp., °F | 398 | | 414 | 418 | | 426 | 425 |
| Pressure, p. s. i. g | 10 | 10 | 25 | 25 | 50 | 50 | 100 |
| Space Vel., V./Hr./V | 190 | 230 | 280 | 440 | 520 | 560 | 585 |
| Fresh Feed Rate, C. F./H | 45 | 54 | 64 | 108 | 118 | 117 | 122 |
| Inlet Vel., Ft./Sec. (Superficial) | 0.6 | 0.7 | 0.5 | 0.9 | 0.6 | 0.6 | 0.6 |
| Height of Dense Phase, feet | 10.8 | | 10.8 | 11.9 | | 10.5 | 10.3 |
| Density of Dense Phase, pounds/cu. ft | 31.2 | | 37.7 | 32.5 | | 37.0 | 35.1 |
| Fresh Feed Gas, Mol Percent: | | | | | | | |
| $H_2$ | 62 | | 61 | 61 | | 60 | 61 |
| CO | 32 | | 33 | 33 | | 33 | 33 |
| Other components, $CO_2$, $N_2$, $CH_4$ | 6 | | 6 | 6 | | 7 | 6 |
| Results: | | | | | | | |
| Contraction, Percent | 34 | 63 | 62 | 36 | 53 | 44 | 47 |
| CO Disappearance, Percent | 40 | | 67 | 38 | | 47 | 49 |
| Observed Oil + Wax, cc./m. of fresh feed | 53 | 64 | 84 | 51 | 69 | 57 | 57 |
| Wax, cc./m.³ of fresh feed | 0 | 5 | 7 | 8 | 13 | 8 | |
| Est. Total Oil, cc./m.³ of fresh feed | 99 | | 121 | 81 | | 93 | 81 |
| Oxygenated Comp., cc./m.³ of fresh feed | 1 | | 6 | 3 | | 14 | 16 |
| Observed Water, cc./m.³ of fresh feed | 124 | 132 | 160 | 103 | 127 | 117 | 109 |
| Selectivity,[2] Percent: | | | | | | | |
| CO→$CO_2$ | 3 | | 1 | 1 | | 4 | −5 |
| CO→$CH_4$+$C_2$ | 10 | | 17 | 19 | | 17 | 17 |
| Product Quality: Secondary Receiver Product (Tap water temperature and operating pressure)— | | | | | | | |
| Gravity, °A. P. I | 54.6 | 56.4 | 57.6 | 56.9 | | 58.5 | 59.5 |
| A. S. T. M. Dist.— | | | | | | | |
| I. B. P | 214 | 163 | 128 | 192 | | 170 | 190 |
| 50% | 445 | 421 | 399 | 410 | | 386 | 360 |
| E. P | 661 | 653 | 633 | 644 | | 634 | 638 |
| Olefins, Percent | 18 | 19 | 24 | 29 | | 31 | 40 |

[1] Recycle operation—recycle ratio (vol.) 0.65:1.
[2] The selectivity is defined as the percent of the compound or compounds in the products based on the carbon monoxide reacted.
Increases in operating pressure substantially increased the oxygenated chemical content of the product.

Several tests were made to determine the optimum temperature of reduction of the cobalt catalyst supported on silica gel-alumina support at temperatures of 650, 700, 750 and 800° F. and atmospheric pressure. The most active catalyst resulted after substantially complete reduction at 750° F. using about 60 v./hr./v. of hydrogen as the reducing agent.

The catalyst of this invention resisted attrition very well and produced optimum yields of valuable organic compounds with the minimum production of methane. The carbon content of the used catalyst was usually below about 3 weight per cent. A high quality diesel fuel was separated from the product.

Inspections of a typical diesel oil produced in high yield over this catalyst are shown below in Table III:

*Table III*

| | |
|---|---|
| Gravity, °API | 51.2 |
| ASTM distillation: | |
| IBP, °F | 394 |
| 10% | 420 |
| 50% | 502 |
| 90% | 642 |
| E. P | 700 |
| Olefin content, Mol percent | 9.8 |
| Diesel index | 100 |
| Aniline point, °F | 196 |
| S. S. U. viscosity at 100° F., secs | 35.2 |
| P. M. C. C. flash point, °F | 180 |

This diesel oil is vastly superior to that required by present day engines, and hence is valuable as an unusually high quality blending agent.

Table IV below is a typical comparison of the supported catalyst of this invention with other cobalt supported catalysts showing the improved catalyst characteristics of the present supported catalyst using comparable conditions of operation:

Table IV

| Catalyst Number | Catalyst Composition based on 1 part Cobalt | Average Reaction Temp., °F. | Yields | |
|---|---|---|---|---|
| | | | Oil, cc./m.³ F. F. | H₂O, cc./m.³ F. F. |
| 178 | Co : 2.0 Silica gel (220° F.) | 388 | 22 | 47 |
| 179 | Co : 2.0 Silica gel (1,300° F.) | 383 | 33 | 62 |
| 311 | Co : 0.25ThO₂ : 2.0 Silica gel | 380 | 21 | 53 |
| 310 | Co : 0.15ThO₂ : 2.0 Silica gel | 380 | 50 | 87 |
| 306 | Co : 0.15ThO₂ : 2.0 Silica gel-alumina | 390 | 153 | 212 |
| 279 | Co : 0.15MgO : 2.0 Silica gel-alumina | 380 | 175 | 219 |
| 308 | Co : 0.25ThO₂ : 2.0 Silica gel-alumina (0.5% K₂O) | 375 | 135 | 197 |
| 309 | Co : 0.25ThO₂ : 1.0 Silica gel-alumina (0.5% K₂O) | 380 | 206 | 202 |
| 314 | Co : 0.15 : ThO₂ 0.25MnO : 2.0 Silica gel-alumina | 424 | 96 | 84 |
| 316 | Co : 0.50MnO : 2.0 Silica gel-alumina | 405 | 135 | 205 |
| 321 | Co : 0.15ThO₂ : 2.0 Silica gel-alumina (not calcined) | 390 | 161 | 203 |
| 322 | Co : 0.15MgO : 2.0 Silica gel-alumina (not calcined) | 400 | 126 | 198 |

All of the above catalysts were prepared in a manner similar to the method previously described. The silica gel-alumina supports of catalysts 321 and 322 were not calcined. Although in the method described the metal salt was precipitated with a sodium carbonate solution, an ammonium carbonate or a potassium carbonate solution could have been used, and actually have been used in other similar experiments.

The foregoing examples indicate satisfactory operating conditions. In general, it may be said that any pressure from atmospheric to any feasible superatmospheric pressure may be employed and as high as 600 or 700 pounds per square inch gage. The temperatures should be maintained above 350° F. and temperatures in the range of 400 to 500° F. are highly satisfactory to effect substantial conversion at high space velocities. At temperatures of 350 to 500° F. space velocities of 50 to 5000, preferably 300 to 1000, standard volumes of reactants per hour per volume of fluidized dense phase are satisfactory; higher space velocities being, in general, associated with higher temperatures. For catalysts comprising about one-third by weight of hydrogenating type metal the above broad range corresponds to about 0.2 to 20 standard liters per hour per gram of hydrogenating metal.

I claim:

1. A process for the hydrogenation of carbon monoxide which comprises flowing a gaseous mixture comprising hydrogen and carbon monoxide through a reaction zone containing a mass of finely divided contact material in a fluidized condition, said contact material consisting essentially of one part by weight of cobalt in combination with between about 0.05 and about 0.2 part by weight of a difficultly reducible metal oxide and about two parts by weight of a support therefor consisting essentially of a substantially completely dehydrated synthetic silica gel containing between about 10 and about 15 weight per cent alumina, maintaining conditions of reaction such that hydrogen and carbon monoxide are converted to organic compounds as products of the process, and withdrawing a gaseous mixture from the reaction zone and recovering reaction products therefrom.

2. A process for the hydrogenation of carbon monoxide which comprises flowing a gaseous mixture comprising hydrogen and carbon monoxide through a reaction zone containing a mass of finely divided contact material suspended therein, said contact material consisting essentially of one part by weight of cobalt in combination with between about 0.05 and about 0.2 part by weight of a difficultly reducible metal oxide and between about one and about three parts by weight of a support therefor consisting essentially of a dehydrated synthetic silica gel dehydrated at a temperature above about 1000° F. and containing between about 10 and about 15 weight per cent alumina and less than 10 per cent by weight of water, maintaining a temperature of reaction between about 350° F. and about 500° F. a pressure between about atmospheric and about 700 pounds per square inch gage and a space velocity between about 50 and about 5000 in said reaction zone such that hydrogen and carbon monoxide are converted into organic compounds as products of the process, and withdrawing a gaseous mixture containing such organic compounds from the reaction zone and recovering the organic compounds as products of the process.

3. A process for hydrogenating carbon oxides which comprises continuously flowing a gaseous mixture comprising hydrogen and a carbon oxide upwardly in a reaction zone through a mass of finely divided contact material consisting essentially of a reduced metal selected from the group consisting of cobalt and nickel in combination with about 0.05 and about 0.2 times its weight of a difficultly reducible metal oxide supported by between about 1 and about 3 times its weight of a synthetic silica gel containing between about 10 and about 15 weight per cent alumina and less than 10 weight per cent water, said contact material having been prepared by heating said synthetic silica gel at a temperature above 1000° F. prior to incorporation with the aforesaid supported constituents of said contact material, passing said gaseous mixture through said mass at a velocity effective to suspend said mass in said gas stream in a dense fluidized pseudo-liquid condition in which the particles of contact material circulate in said mass at a high rate and under conditions such that organic compounds are produced, cooling at least a portion of said turbulent mass of contact material to maintain the mass temperature at the desired reaction temperature level, and withdrawing a gaseous effluent from said reaction zone and recovering reaction products therefrom.

4. The process of claim 3 in which said difficultly reducible metal oxide is thoria.

5. The process of claim 3 in which said difficultly reducible metal oxide is magnesia.

6. The process of claim 3 in which said difficultly reducible metal oxide is manganese oxide.

7. A process for the hydrogenation of carbon monoxide which comprises flowing a gaseous mixture comprising hydrogen and carbon monoxide through a reaction zone containing a mass of finely divided contact material in a fluidized condition, said contact material consisting essentially of one part by weight of cobalt in combination with between about 0.05 and about 0.2 part by weight of a difficultly reducible metal oxide and between about 1 and about 3 parts by weight of a support therefor consisting essentially of a substantially completely dehydrated synthetic silica gel containing between about 5 and about 20 weight per cent alumina, maintaining conditions of reaction such that hydrogen and carbon monoxide are converted to organic compounds as products of the process, and withdrawing a gaseous mixture from said reaction zone and recovering reaction products therefrom.

8. A readily fluidizable and highly active contact material for the hydrogenation of carbon oxide consisting essentially of a reduced metal selected from the group consisting of cobalt and nickel in combination with between about 0.05 and about 0.2 times its weight of a difficultly reducible metal oxide supported by between about 1 and about 3 times its weight of synthetic silica gel containing between about 5 and about 20 weight per cent alumina and less than about 50 weight per cent water, said contact material having been prepared by heating said synthetic silica gel at a temperature above 1000° F. prior to incorporation with the aforesaid supported constituents of said contact material.

9. A readily fluidizable and highly active contact material for the hydrogenation of carbon monoxide consisting essentially of reduced cobalt in combination with between about 0.05 and about 0.2 times its weight of a difficultly reducible metal oxide supported by between about 1 and about 3 times its weight of a synthetic silica gel containing between about 10 and about 15 weight per cent alumina and less than 10 weight per cent water, said contact material having been prepared by heating said support at a temperature above 1000° F. prior to incorporation with the aforesaid supported constituents of said contact material.

10. A readily fluidizable and highly active contact material for the hydrogenation of a carbon oxide which comprises as the principal components thereof a metal selected from the group consisting of cobalt and nickel as the essential catalytic ingredient in combination with between about 1 to about 3 times its weight of a support therefor consisting essentially of a synthetic silica gel containing between about 5 and about 20 weight per cent alumina and less than 50 weight per cent water, said contact material having been prepared by heating said synthetic silica gel at a temperature above 1000° F. prior to incorporation with the aforesaid supported constituent of said contact material.

11. A readily fluidizable and highly active contact material for the hydrogenation of carbon oxide consisting essentially of cobalt supported by between about 1 and about 3 times its weight of a synthetic silica gel containing between about 5 and about 20 weight per cent alumina and less than 50 weight per cent water, said contact material having been prepared by heating said synthetic silica gel support at a temperature above 1000° F. prior to incorporation with aforesaid supported constituent of said contact material.

HENRY G. McGRATH.

References Cited in the file of this patent

UNITED STATES PATENTS

| Number | Name | Date |
|---|---|---|
| 2,215,305 | Voorhies | Sept. 17, 1940 |
| 2,339,927 | Heckel | Jan. 25, 1944 |
| 2,360,787 | Murphree et al. | Oct. 17, 1944 |
| 2,406,864 | Thomas | Sept. 3, 1946 |
| 2,417,164 | Huber, Jr. | Mar. 11, 1947 |
| 2,447,505 | Johnson | Aug. 24, 1948 |
| 2,460,508 | Johnson et al. | Feb. 1, 1949 |
| 2,496,265 | Bilisoly | Feb. 7, 1950 |